(12) United States Patent
Thayer (10) Patent No.: US 9,068,499 B2
(45) Date of Patent: Jun. 30, 2015

(54) TURBINE HOUSING WITH INTEGRATED RIBS

(75) Inventor: Michael Thayer, Asheville, NC (US)

(73) Assignee: Borg Warner Inc., Auburn Hills, MI (US)

(*) Notice: Subject to any disclaimer, the term of this patent is extended or adjusted under 35 U.S.C. 154(b) by 660 days.

(21) Appl. No.: 12/440,491

(22) PCT Filed: Sep. 20, 2007

(86) PCT No.: PCT/US2007/079064
§ 371 (c)(1),
(2), (4) Date: Mar. 9, 2009

(87) PCT Pub. No.: WO2008/036832
PCT Pub. Date: Mar. 27, 2008

(65) Prior Publication Data
US 2009/0280006 A1    Nov. 12, 2009

Related U.S. Application Data

(60) Provisional application No. 60/826,494, filed on Sep. 21, 2006.

(51) Int. Cl.
| F04D 29/44 | (2006.01) |
| F02B 37/00 | (2006.01) |
| F02B 39/00 | (2006.01) |
| F02C 6/12 | (2006.01) |
| F02B 37/007 | (2006.01) |
| F02B 37/013 | (2006.01) |

(52) U.S. Cl.
CPC .............. *F02B 37/00* (2013.01); *F02B 37/007* (2013.01); *F02B 37/013* (2013.01); *F02B 39/00* (2013.01); *Y02T 10/144* (2013.01); *F02C 6/12* (2013.01); *F05D 2240/126* (2013.01)

(58) Field of Classification Search
USPC ........................... 415/159, 184, 191, 205, 204
See application file for complete search history.

(56) References Cited

U.S. PATENT DOCUMENTS

| 813,918 | A | * | 2/1906 | Sohmitz ........................ 165/141 |
| 3,635,580 | A | | 1/1972 | Richardson et al. |
| 4,529,356 | A | | 7/1985 | Ciccarone |
| 4,924,838 | A | * | 5/1990 | McCandless .................. 123/541 |

(Continued)

FOREIGN PATENT DOCUMENTS

| EP | 1273761 A1 | 1/2003 |
| FR | 2461811 A1 | 2/1981 |

(Continued)

OTHER PUBLICATIONS

Supplementary European Search Report dated Mar. 21, 2013.

*Primary Examiner* — Bradley K Smith
*Assistant Examiner* — David Goodwin
(74) *Attorney, Agent, or Firm* — Miller Canfield (57) ABSTRACT

A flow direction system (200) for a turbocharger (1) or other fluid impeller device is provided that can reduce swirl or turbulence of exhaust gases being supplied to a turbine rotor (4). The system (200) uses one or more ribs (250) or fins that extend from an inner surface (110) of an inlet (100) of the turbine housing (2) and that can be integrally formed with the inlet (100). The ribs (250) can be diametrically opposed along the inner surface (110) and can extend less than half way across the inlet (100). The ribs (250) can have chamfered leading or trailing edges to reduce drag.

7 Claims, 7 Drawing Sheets

(56) References Cited

U.S. PATENT DOCUMENTS

| | | | |
|---|---|---|---|
| 5,309,946 A * | 5/1994 | Ligneul | 138/39 |
| 5,531,484 A | 7/1996 | Kawano | |
| 6,739,832 B2 * | 5/2004 | Hansen et al. | 415/159 |
| 6,767,185 B2 * | 7/2004 | Martin et al. | 415/205 |
| 6,804,360 B1 | 10/2004 | Misawa et al. | |
| 7,089,963 B2 * | 8/2006 | Meheen | 138/44 |
| 8,579,585 B2 * | 11/2013 | Hermann et al. | 415/200 |
| D697,581 S * | 1/2014 | Sawchuk et al. | D23/213 |
| 2002/0192076 A1 | 12/2002 | Hansen | |
| 2008/0298953 A1 * | 12/2008 | Harris | 415/144 |

FOREIGN PATENT DOCUMENTS

| | | |
|---|---|---|
| JP | 2000120497 A | 4/2000 |
| KR | 100174734 B1 | 4/1999 |
| KR | 2020000008216 U | 5/2000 |
| KR | 1020000052244 A | 8/2000 |
| KR | 1020020041085 A | 6/2002 |

* cited by examiner

FIG. 7

TURBINE HOUSING WITH INTEGRATED RIBS

FIELD OF THE INVENTION

This invention is directed to a turbocharging system for an internal combustion engine and more particularly to flow direction in a turbine housing.

BACKGROUND OF THE INVENTION

Turbochargers are a type of forced induction system. They compress the air flowing into an engine, thus boosting the engine's horsepower without significantly increasing weight. Turbochargers use the exhaust flow from the engine to spin a turbine, which in turn drives an air compressor. Since the turbine spins about 30 times faster than most car engines and it is hooked up to the exhaust, the temperature in the turbine is very high. Additionally, due to the resulting high velocity of flow, turbochargers are subjected to noise and vibration. Such conditions can have a detrimental effect on the components of the turbocharger, particularly on the rotating parts such as the turbine rotor, which can lead to failure of the system.

Swirling and/or turbulent flow of the exhaust gases into the turbine rotor increases the problems associated with noise, vibration and harshness. Exhaust gases entering the inlet of the turbine of a turbocharger in automotive and other applications pass through various bends and restrictions in the exhaust manifold. These restrictions and bends cause the exhaust gases to be turbulent and/or swirling, resulting in less than optimum efficiency or performance of the turbine of the turbocharger. Further, due to the turbine rotor or wheel rotation, incoming gases can swirl in the same direction as the rotation of the rotor adding to its inefficiency.

Figure 1:
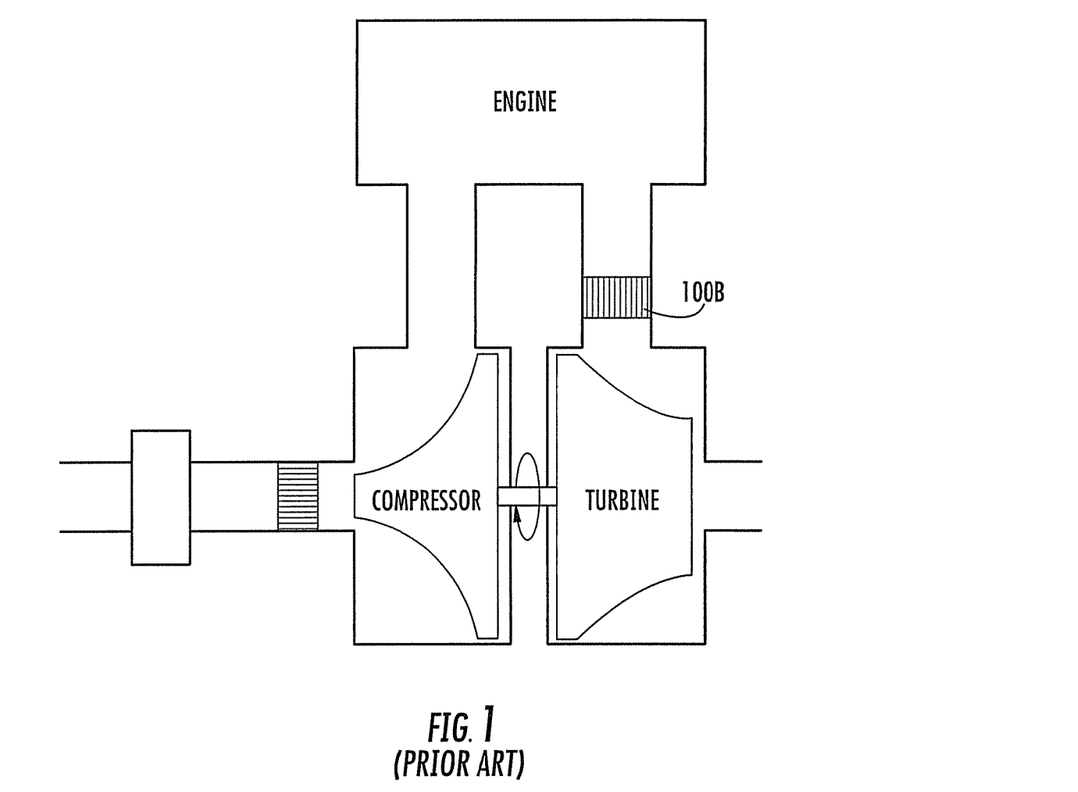
FIG. 1 is a schematic representation of a contemporary turbocharger system.
Figure 2:
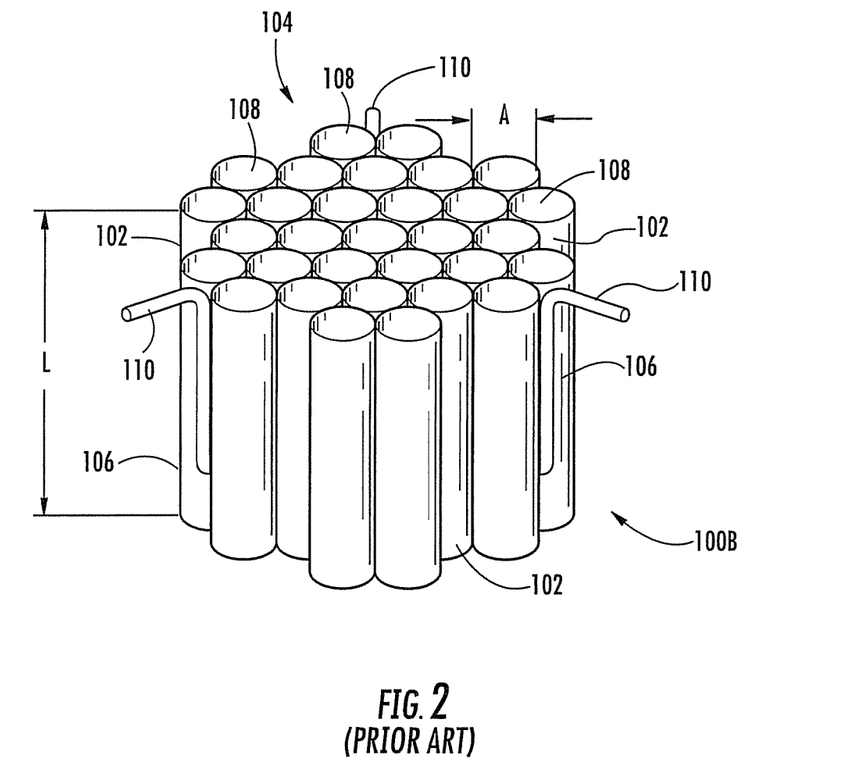
FIG. 2 is a perspective view of a flow laminarizing device used in the turbocharger of FIG. 1.

An attempt to address the above described drawbacks was made in U.S. Pat. No. 7,089,963 to Meheen through the use of a "flow laminarizing device." The Meheen device is shown in FIGS. 1 and 2 and includes a plurality of tubes 102, which define a single cluster 104. Each of the tubes 102 has a wall 106, defining a passageway 108 that allows fluid flow. Each passageway 108 has a length L and a cross-sectional area A. The Meheen device 100B has retaining arms 110 that support the device in a fixed position. Fluid laminarizing and fluid drag can be controlled in the Meheen device 100B through the variation of the number, size and wall roughness of the tubes 102.

However, the Meheen device is a relatively complex, separate structure that increases cost and requires installation. The Meheen device suffers from the drawback of its own deterioration over time, which can increase the potential for foreign object damage if a portion of the device becomes separated from the cluster 104 and impacts the turbine rotor. This is especially a problem where the cluster 104 is formed from individual components such as tubes 102 and retaining arms 110 that are welded together or otherwise bonded, which may over time break apart given the high stress environment where the device is situated.

Thus, there is a need for a flow control or direction system at the inlet of a turbine that is effective at reducing or eliminating turbulent flow and/or swirl. There is a further need for such a system that is cost effective and dependable.

SUMMARY OF THE INVENTION

The exemplary embodiments of the flow direction system. and the turbocharger that uses the system, redirect flow towards alignment with a longitudinal axis of the turbine inlet. By redirecting the flow, the exhaust gases that impact the turbine rotor have reduced swirl and/or turbulence which improves the efficiency of the rotor and decreases negative effects on the turbocharger components. The system can use components, such as ribs or fins, that are integrally formed with the rest of the turbine housing, such as during a forging process, so that the components are stronger and less prone to failure, as well as more cost effective.

In one aspect, a flow direction system for a turbocharger is provided. The system comprises one or more ribs integrally formed along an inner surface of the turbine inlet. The one or more ribs have a surface that can be substantially parallel to, or substantially along the same direction as, the longitudinal axis of the turbine inlet. The surface is in a flow path of exhaust gases entering the inlet and redirects the exhaust gases towards alignment with the longitudinal axis to reduce swirl or turbulence.

In another aspect, a turbocharger is provided comprising a compressor housing having a compressor wheel; and a turbine housing having a turbine rotor and a turbine inlet. The turbine rotor is operably connected to the compressor wheel for driving the compressor wheel. The turbine inlet has one or more ribs along an inner surface of the turbine inlet. Each of the one or more ribs has a pair of surfaces that can be substantially parallel to, or substantially along the same direction as, the longitudinal axis of the turbine inlet. The pair of surfaces are in a flow path of exhaust gases entering the inlet and redirect the exhaust gases towards the longitudinal axis to reduce swirl or turbulence when the exhaust gases drive the turbine rotor.

In another aspect, a method of reducing swirl or turbulence in exhaust gases driving a turbine rotor is provided that comprises providing exhaust gases from a combustion engine to a turbine inlet of a turbine housing; redirecting the exhaust gases at the turbine inlet via one or more surfaces that are substantially parallel to the longitudinal axis of the turbine inlet and extend from an inner surface of the turbine inlet; and driving the turbine rotor with the redirected exhaust gases. The one or more surfaces are in a flow path of exhaust gases entering the inlet and redirect the exhaust gases to reduce swirl or turbulence The ribs can be diametrically opposed along the inner surface of the inlet. The ribs may have the same shape. The ribs can have a chamfered leading edge. The ribs may have a chamfered trailing edge. The ribs can have a lower portion of increased width. The ribs may extend less than half way across the inlet. The ribs can be integrally formed with the inner surface of the inlet during a forging, machining or manufacturing process of the turbine housing. The ribs can be symmetrically configured along the inner surface of the turbine inlet.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Figure 3:
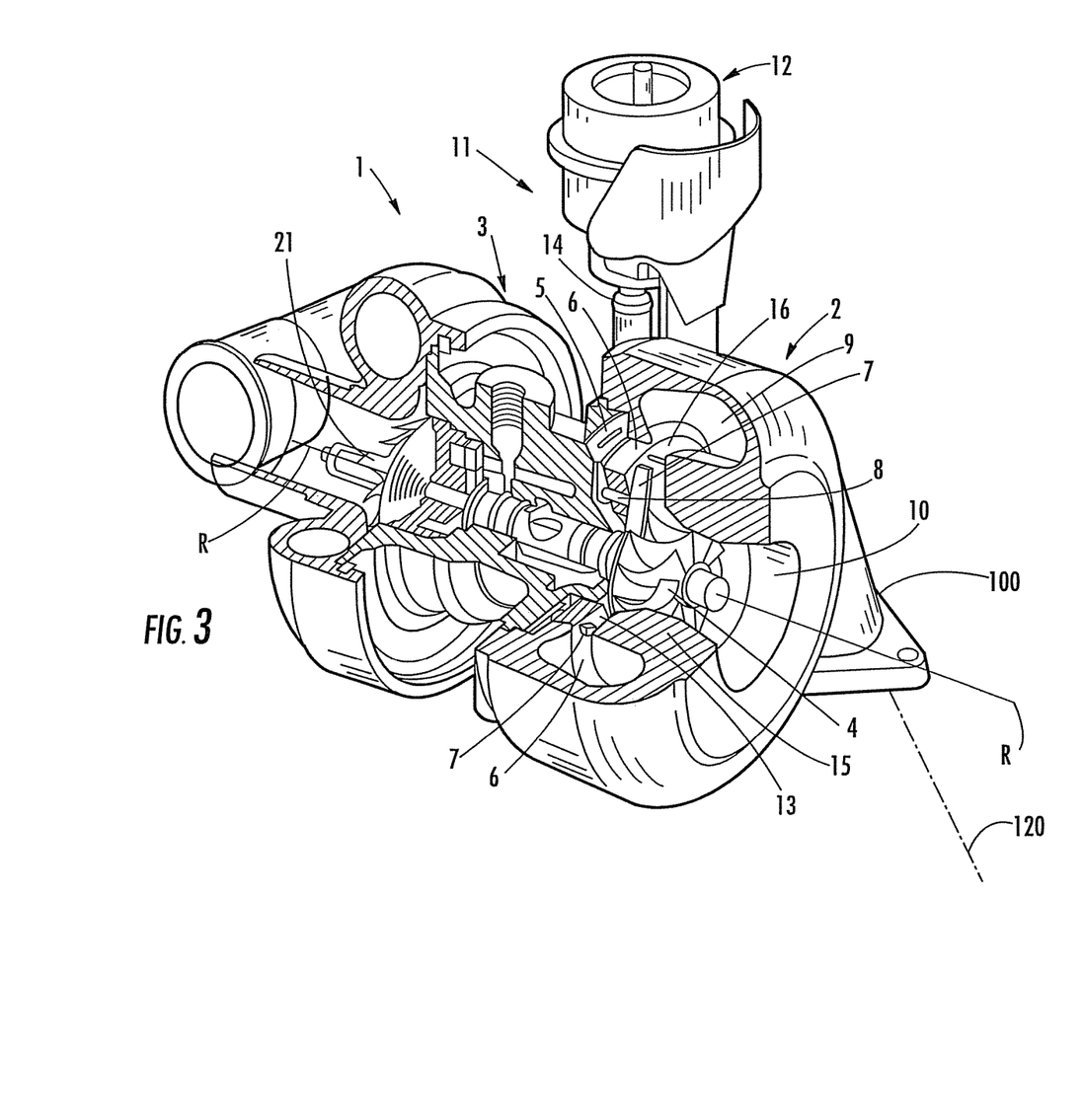
FIG. 3 is a perspective view of a turbocharger having a flow direction system in accordance with an exemplary embodiment of the invention.

Referring to FIG. 3, a turbocharger 1 has a turbine housing 2 and a compressor housing 3 connected to each other and positioned along an axis of rotation R. The turbine housing 2 has an outer guiding grid of guide vanes 7 over the circumference of a support ring 6. The guide vanes 7 may be pivoted by pivoting shafts 8 inserted into bores of the support ring 6 so that each pair of vanes define nozzles of selectively variable cross-section according to the pivoting position of the vanes 7. This allows for a larger or smaller amount of exhaust gases to be supplied to a turbine rotor 4. The exhaust gases are provided to the guide vanes 7 and rotor 4 by a supply channel 9 having an inlet 100. The exhaust gases are discharged through a central short feed pipe 10, and the rotor 4 drives a compressor rotor 21 fastened to the shaft of the rotor.

In order to control the position of the guide vanes 7, an actuation device 1 can be provided having a control housing 12, which controls an actuation movement of a pestle member 14 housed therein, whose axial movement is converted into a rotational movement of a control ring 5 situated behind the support ring 6. By this rotational movement, the guide vanes 7 may be displaced from a substantially tangential extreme position into a substantially radially extending extreme position. In this way a larger or smaller amount of exhaust gases from a combustion motor supplied by the supply channel 9 can be fed to the turbine rotor 4, and discharged through the axial feed pipe 10. Between the vane support ring 6 and a ring-shaped portion 15 of the turbine housing 2, there can be a relatively small space 13 to permit free movement of the vanes 7. The shape and dimensions of the vane space 13 can be chosen to increase the efficiency of the turbocharger 1, while allowing for thermal expansion due to the hot exhaust gases. To ensure the width of the vane space 13 and the distance of the vane support ring 6 from the opposite housing ring 5, the vane support ring 6 can have spacers 16 formed thereon.

Figure 4:
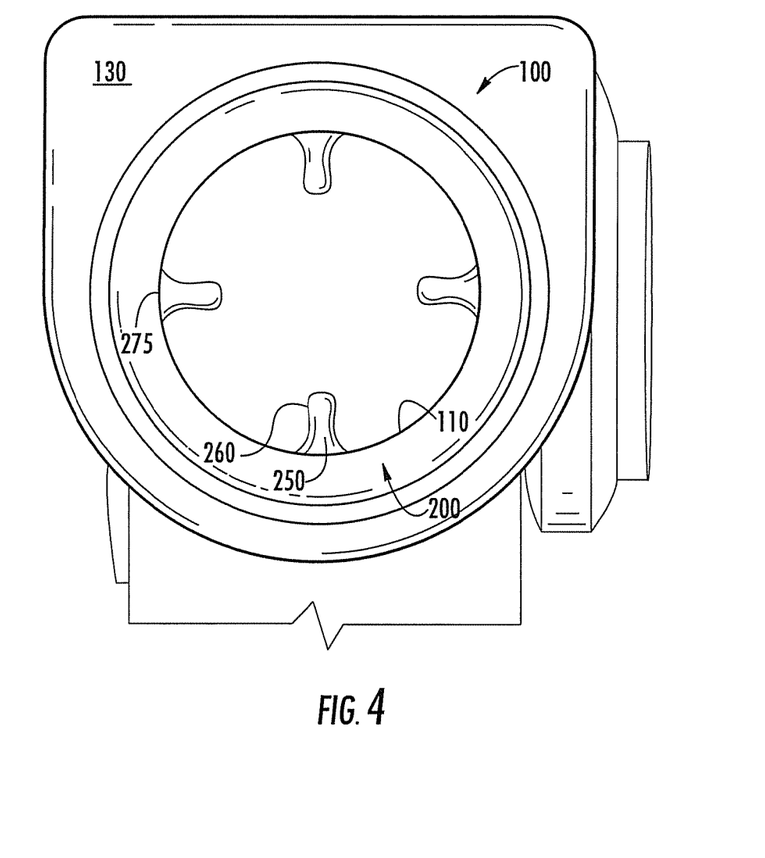
FIG. 4 is a plan view of the turbine inlet with the flow direction system of FIG. 3.
Figure 5:
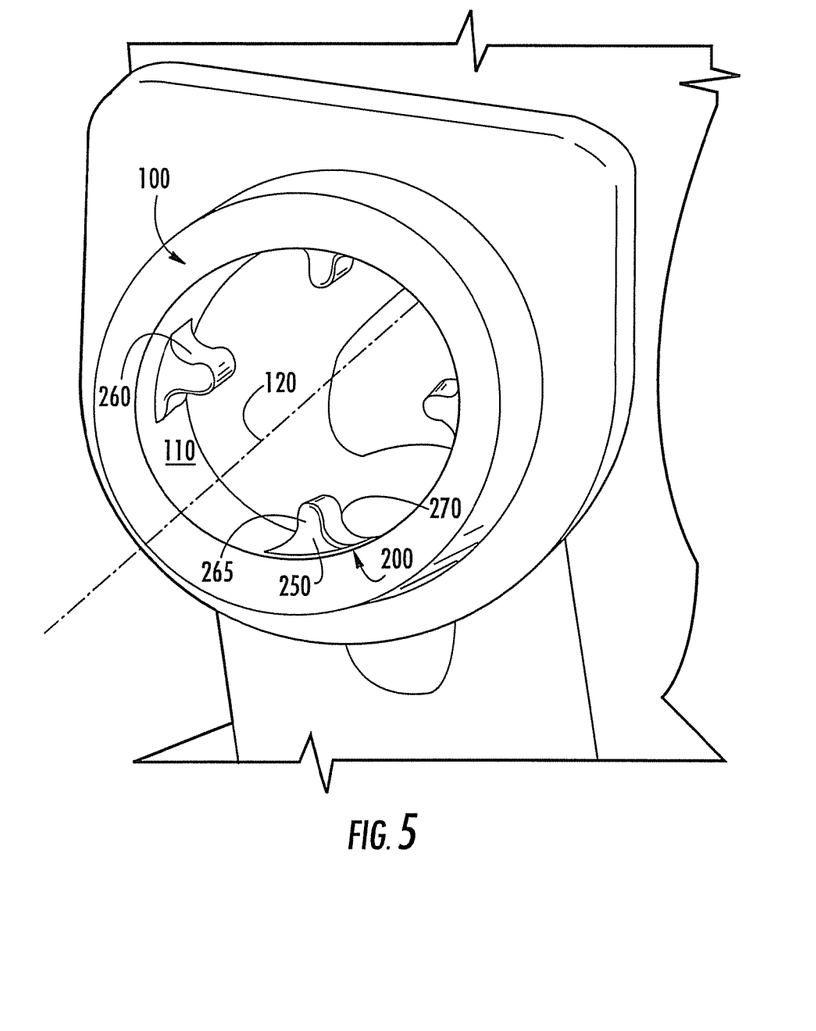
FIG. 5 is a perspective view of the turbine inlet of FIG. 4.
Figure 6:
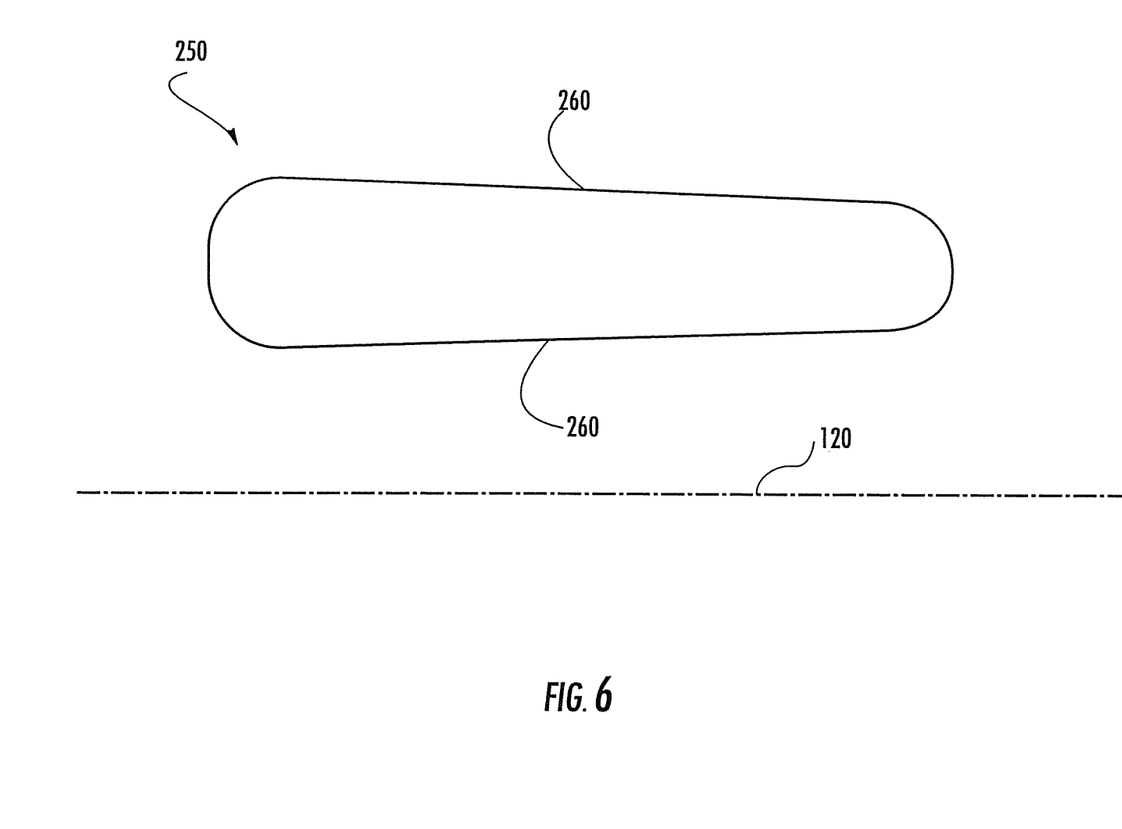
FIG. 6 is a plan view of one of the ribs along the turbine inlet.

The exhaust gases being supplied from the combustion engine can be swirling and/or turbulent, which can have a detrimental effect on the components of the turbocharger 1 and can reduce efficiency of the turbocharger. To reduce or eliminate the swirling and/or turbulent flow, inlet 100 has a flow direction system 200 as shown in FIGS. 4-6. Flow direction system 200 has one or more ribs or fins 250 that extend radially inward from an inner surface 110 of the inlet 100. The ribs 250 extend into the flow path of the exhaust gases and can have flat or substantially flat surfaces 260 that reduce or eliminate the swirling and/or turbulence in the exhaust gases. It should be understood that the present disclosure contemplates varying the distance along the flow path of the ribs 250 from the turbine rotor 4. The exemplary embodiment shows the inlet 100 being a ring disposed along a connecting flange 130. However, the present disclosure contemplates other types of inlets 100 upstream of the turbine rotor 4 upon which the flow directing system 200 can be formed. Such inlets can be integrally formed with the rest of the housing or can be assembled therewith.

The surfaces 260 are preferably substantially along a direction of the longitudinal axis 120 of the inlet 100 and can be parallel thereto. Swirling and/or turbulent exhaust gases are thus redirected along the surfaces 260 to a path that is more aligned with the longitudinal axis 120. The particular size, shape, number and configuration of the ribs 250 and their surfaces 260 can be chosen to achieve the desired amount of flow redirection, while also taking into consideration the effects of flow drag and cost. In the exemplary embodiment, there are four ribs 250 that are diametrically opposed along inner surface 110 of the inlet 100. However, the present disclosure contemplates the use of other numbers of ribs 250, as well as other positions or configurations of the ribs including symmetrical and non-symmetrical configurations.

The ribs 250 preferably have an efficient aerodynamic shape to reduce or eliminate drag upon the exhaust gases and are preferably of the same shape and dimensions. Such a shape of ribs 250 can include minimized or chamfered leading and/or trailing edges 265, 270. The sides 260 can be angled towards each other to provide for a diminishing width of the ribs 250 as shown in FIG. 6. Ribs 250 can have a width of about 5 mm and a height of about 10 to about 15 mm. However, the present disclosure contemplates the use of other shapes and dimensions for the ribs 250, as well as varying the shapes and dimensions of one or more of the ribs along the inlet 100.

Ribs 250 can preferably be integrally formed with the inlet 100 of turbine housing 2 during a forging, manufacturing or machining process, and can be formed of the same materials as the rest of the inlet and/or turbine housing. By having one or more integrally formed ribs 250 as opposed to separate components that are assembled with the inner surface 110, such as through fastening devices or welding, flow direction system 200 reduces or eliminates the potential for foreign object damage. A lower portion 275 of the ribs 250 can be of increased width to provide strength along a higher stress region of the ribs, as well as to facilitate the forging, machining or manufacturing process. The surface 260 can be a curved or tapered surface to form the lower portion 275 of increased width. The ribs 250 can be of uniform width, height and length or can be of varying width, height and length. The particular distance that the ribs 250 extend into the flow path can be varied. Preferably, the ribs 250 extend less than half way across the inlet 100 to reduce drag.

The use of integrally formed ribs 250 that are of the same material as the rest of the inlet 100 also reduces or eliminates any problems associated with differences in thermal growth, as opposed to separate components assembled to the inlet that can have different rates of thermal expansion in the high temperature exhaust gas than the rest of the inlet. Such different rates of thermal expansion can lead to failure due to imposing additional stress on the components, the inlet and their fastening structures or techniques (e.g., welding).

The ribs 250 can be made from cast iron or other appropriate materials. The present disclosure contemplates the ribs 250 being made from metals, as well as non-metals such as ceramic matrix composites, and combinations thereof. While the exemplary embodiment describes ribs 250 being made from the same material as the inlet 100, the present disclosure contemplates the ribs being made from a different material than the inlet which may or may not be integrally forged or manufactured together.

Figure 7:
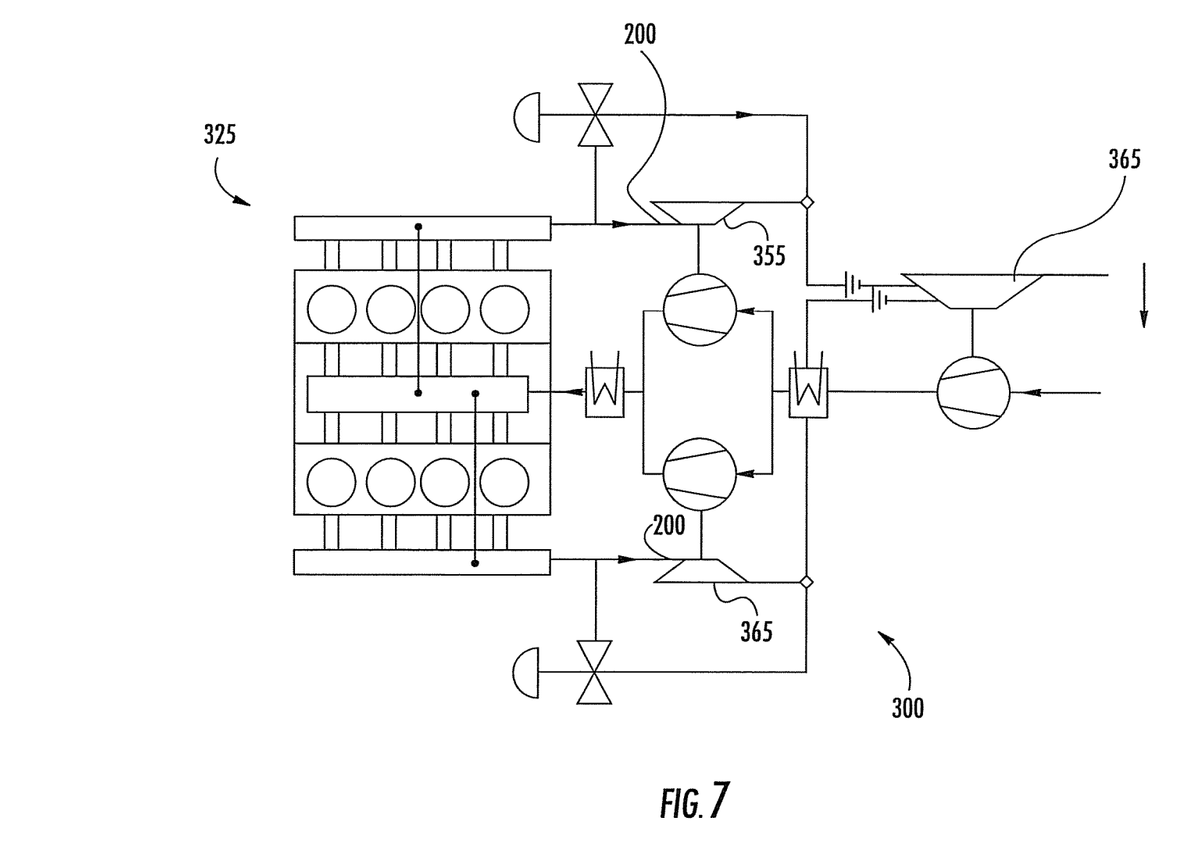
FIG. 7 is a schematic representation of exhaust and fresh-air flow of a two-stage turbocharged diesel internal combustion engine in V-shape with the turbocharger of FIG. 3.

Referring to FIG. 7, the flow direction system of the exemplary embodiment described-above may be incorporated into a multi-stage turbocharger system as shown and generally represented by reference numeral 300. The multi-stage system 300 is connected to an internal combustion engine 325 and has a plurality of turbines. For example, the system 300 can have a high pressure stage 350 with one or more high pressure turbines 355 and a low pressure stage 360 with one or more low pressure turbines 365 (only one shown). One or more of these turbines can be provided with the flow direction system 200 as described above with respect to FIGS. 3-6. For example, the flow direction system 200 can be positioned between two of the turbines 355 to reduce the swirl or turbulence.

While the present disclosure has been described with respect to a turbocharger having variable geometry guide vanes, it should be understood that the exemplary embodiment of the flow direction system 200 can be used with other types of turbochargers. It is also contemplated by the present disclosure that flow direction system 200 can be used with other types of fluid impelling devices that are subjected to inefficiencies due to turbulent and/or swirling inlet flow. Such other fluid impelling devices include, but are not limited to, the following: superchargers; centrifugal pumps; centrifugal fans; single-stage gas compressors; multistage gas compressors; and other kinds of devices which generally use one or more rotating elements to compress gases and/or induce fluid flow.

While the invention has been described by reference to a specific embodiment chosen for purposes of illustration, it should be apparent that numerous modifications could be made thereto by those skilled in the art without departing from the spirit and scope of the invention.

The invention claimed is:

1. A turbocharger (1) comprising:
   a turbine housing (2) including a turbine inlet (100) that defines a longitudinal axis; and
   a turbine rotor (4) disposed in the turbine housing and in fluid communication with the turbine inlet via a supply channel (9);
   wherein the turbine inlet includes
   a connecting flange (130) disposed at an end of the supply channel;
   an axially-protruding ring disposed on a surface of the connecting flange that faces away from the supply channel, the ring defining an inner surface (110) that extends between a ring first end that abuts the surface of the connecting flange and a ring second end opposed to the ring first end the ring second end disposed outside the supply channel; and
   integral ribs (250) that protrude inward from the inner surface (110), each of the ribs including a surface in a flow path of exhaust gases entering the turbine inlet, the surface configured to redirect the exhaust gases towards alignment with the longitudinal axis of the turbine inlet to reduce swirl or turbulence of the exhaust gases at the turbine rotor, and
   each of the ribs has an axial dimension that corresponds to an axial dimension of the ring.

2. The turbocharger of claim 1, wherein each of the ribs extends less than half way across the turbine inlet and has a radial dimension that is uniform along its length in the axial direction.

3. The turbocharger (1) of claim 1, wherein ribs (250) are diametrically opposed along the inner surface (110) of the turbine inlet (100).

4. The turbocharger (1) of claim 1, wherein each rib (250) has the same shape.

5. The turbocharger (1) of claim 1, wherein the ribs (250) have a chamfered leading edge.

6. The turbocharger (1) of claim 1, wherein the ribs (250) have a chamfered trailing edge.

7. The turbocharger (1) of claim 1, wherein the ribs (250) have a lower portion of increased width.

* * * * *